(12) United States Patent
Goto et al.

(10) Patent No.: US 9,281,528 B2
(45) Date of Patent: Mar. 8, 2016

(54) FUEL CELL AND FUEL CELL SYSTEM

(75) Inventors: Sogo Goto, Nishikamo-gun (JP); Satoshi Futami, Toyota (JP); Kazunori Shibata, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 478 days.

(21) Appl. No.: 12/741,966

(22) PCT Filed: Mar. 30, 2009

(86) PCT No.: PCT/IB2009/005113
§ 371 (c)(1),
(2), (4) Date: May 7, 2010

(87) PCT Pub. No.: WO2009/122256
PCT Pub. Date: Oct. 8, 2009

(65) Prior Publication Data
US 2011/0097638 A1    Apr. 28, 2011

(30) Foreign Application Priority Data

Mar. 31, 2008 (JP) ................................ 2008-090333

(51) Int. Cl.
*H01M 8/02* (2006.01)
*H01M 8/04* (2006.01)
*H01M 8/10* (2006.01)

(52) U.S. Cl.
CPC ........ *H01M 8/0267* (2013.01); *H01M 8/04029* (2013.01); *H01M 8/04126* (2013.01); *H01M 2008/1095* (2013.01); *Y02E 60/50* (2013.01)

(58) Field of Classification Search
CPC .......... H01M 8/04074; H01M 8/0267; H01M 8/0269; H01M 8/04007
See application file for complete search history.

(56) References Cited

U.S. PATENT DOCUMENTS

| | | | |
|---|---|---|---|
| 2002/0071981 A1* | 6/2002 | Sano et al. | 429/30 |
| 2002/0146612 A1 | 10/2002 | Sugiura et al. | |
| 2009/0042069 A1 | 2/2009 | Sugiura et al. | |
| 2011/0097639 A1* | 4/2011 | Darling et al. | 429/434 |

FOREIGN PATENT DOCUMENTS

| | | | |
|---|---|---|---|
| EP | 1 241 726 | 9/2002 | |
| EP | 1241726 A2 * | 9/2002 | ............ H01M 8/24 |

(Continued)

OTHER PUBLICATIONS

Canadian Office Action issued Jul. 4, 2012, in Canada Patent Application No. 2,707,529.

*Primary Examiner* — Barbara Gilliam
*Assistant Examiner* — Angela Martin
(74) *Attorney, Agent, or Firm* — Oblon, McClelland, Maier & Neustadt, L.L.P

(57) ABSTRACT

A fuel cell includes: an electrolyte membrane; a first reactive gas channel that is provided on a first surface side of the electrolyte membrane; a second reactive gas channel that is provided on a second surface side of the electrolyte membrane; and a coolant channel. The coolant channel is configured such that a flow direction of the first reactive gas flowing in the first reactive gas channel is opposite to a flow direction of the second reactive gas flowing in the second reactive gas channel, and a downstream portion of the flow of at least one of the first and second reactive gases, in a plane of the electrolyte membrane, is cooled from the central portion within the plane.

9 Claims, 11 Drawing Sheets

(56) References Cited

FOREIGN PATENT DOCUMENTS

| | | |
|---|---|---|
| JP | 2002-184428 | 6/2002 |
| JP | 2003-249243 | 9/2003 |
| JP | 2004 516612 | 6/2004 |
| JP | 2005 32561 | 2/2005 |
| JP | 2005 251416 | 9/2005 |
| JP | 2005 339872 | 12/2005 |
| JP | 2005-339872 A * 12/2005 | ............. H01M 8/04 |
| JP | 2005339872 * 12/2005 | ............. H01M 8/04 |
| JP | 2007 141552 | 6/2007 |
| JP | 2008-47395 | 2/2008 |

* cited by examiner

COMPARATIVE EXAMPLE

FUEL CELL AND FUEL CELL SYSTEM

CROSS-REFERENCE TO PRIORITY APPLICATIONS

The present application claims priority to Japanese Patent Application No. 2008-090333 filed on Mar. 31, 2008, the entire contents including the specification, drawings, and abstract of which are hereby incorporated herein by reference.

BACKGROUND OF THE INVENTION

1. Field of the Invention

This invention relates to a fuel cell.

2. Description of the Related Art

It is desirable that some electrolytes in fuel cells be appropriately wetted, and a variety of humidification methods for reactive gases have been used. Because a fuel cell generates heat when power is generated, the fuel cell usually has a cooling structure for cooling with a coolant, for example, as disclosed in Japanese Patent Application Publication No. 2005-251416 (JP-A-2005-251416).

However, accelerating the wetting of electrolyte membrane by using a cooling structure using a coolant has not been heretofore attempted.

SUMMARY OF THE INVENTION

The invention was created to resolve the above-described problem and provides a fuel cell in which wetting of an electrolyte membrane of a fuel cell is enhanced and power generation capacity of the fuel cell is stabilized.

According to the first aspect of the invention, there is provided a fuel cell including; an electrolyte membrane; a first reactive gas channel which is provided on a first surface side of the electrolyte membrane, and in which a first reactive gas flows; a second reactive gas channel which is provided on a second surface side of the electrolyte membrane, and in which a second reactive gas flows; and a coolant channel in which a coolant flows, wherein the coolant channel is so configured that a flow direction of the first reactive gas flowing in the first reactive gas channel is opposite to a flow direction of the second reactive gas flowing in the second reactive gas channel, and a downstream portion of the flow of at least one of the first and second reactive gases, in a plane of the electrolyte membrane, is cooled more than the central portion within the plane. With such a fuel cell, it is possible to cause condensation of moisture in the downstream portion of the reactive gas flow, supply the moisture to the electrolyte membrane, wet the electrolyte membrane, and stabilize the power generation capacity of the fuel cell.

In the fuel cell, the first and second reactive gases may be a fuel gas and an oxidizing gas, and the downstream portion may be a downstream portion of the fuel gas flow. With such a fuel cell, it is possible to cause condensation of moisture in the downstream portion of the fuel gas flow and wet the electrolyte membrane.

In the fuel cell, the coolant channel may be configured to cool an upstream portion of the oxidizing gas flow. With such a fuel cell, evaporation of moisture from the electrolyte membrane and drying of the electrolyte membrane in the upstream portion of the oxidizing gas can be inhibited.

In the fuel cell, the coolant channel may be configured to cool both a downstream portion of the fuel gas flow and a downstream portion of the oxidizing gas flow. With such a fuel cell, moisture can be caused to condensate in the downstream portion of both the fuel gas flow and the oxidizing gas flow.

The fuel cell may further include a rectangular separator, wherein inlet ports and outlet ports of the coolant channel may be disposed on the same side of the separator. With such a fuel cell, by disposing the outlet ports of the coolant channel on the same side as the inlet ports of the coolant channel, it is possible to cool the upstream portion of the reactive gas flow easier than in a case of a linear channel.

In such a fuel cell, a channel formation portion that causes a coolant flow to curve between the inlet ports and outlet ports may be formed in the coolant channel. Furthermore, the channel formation portion may have a sand spit shape protruding from a side of the separator toward a central portion. With such a fuel cell, because the coolant flow is curved, the electrolyte membrane can be easier cooled.

In the electrolyte membrane, a plurality of channel formation portions that guide a coolant from the inlet port to the outlet port may be formed in the coolant channel, and a spacing between the adjacent channel formation portions may be small in a central portion of the separator and large in outer edge portions of the separator. With such a fuel cell, the coolant flows easier in the outer edge portions than in the central portion. Therefore, the upstream portion and downstream portion of the reactive gases can be preferentially cooled and the electrolyte can be better wetted.

In the fuel cell, a plurality of the inlet ports and a plurality of the outlet ports, may be provided, and the inlet ports and the outlet ports may be provided respectively on opposing sides of the separator. With such a fuel cell, the coolant is supplied from both sides. Therefore, the electrolyte membrane can be easily cooled.

In the fuel cell, a first coolant channel adjacent to the first reactive gas channel and a second coolant channel that is provided separately from the first coolant channel and adjacently to the second reactive gas channel may be provided as the coolant channel, a flow direction of the first reactive gas flow may be opposite to a flow direction of the coolant flowing in the first coolant channel, and a flow direction of the second reactive gas may be opposite to a flow direction of the coolant flowing in the second coolant channel. With such a fuel cell, the downstream portion of the reactive gas flow can be preferentially cooled and moisture located in the reactive, gas channel can be caused to condensate.

According to another aspect of the invention, there is provided a fuel cell system including a reactive gas supply portion that supplies first and second reactive gases, and a coolant supply portion that supplies a coolant, wherein the electrolyte membrane is wetted by causing moisture contained in the reactive gases to condensate by cooling a downstream portion of at least one of the first and second reactive gas flows with the coolant channel, without providing a humidifying module for humidifying the first and second reactive gases. According to such a fuel cell system, additional equipment for wetting the electrolyte membrane is not required.

The invention can be realized in a variety of forms, for example, in the form of a method for humidifying the fuel cell and a method for cooling the fuel cell, in addition to the fuel cell.

BRIEF DESCRIPTION OF THE DRAWINGS

The features, advantages, and technical and industrial significance of this invention will be described in the following detailed description of example embodiments of the inven

DETAILED DESCRIPTION OF EMBODIMENTS

Figure 1:
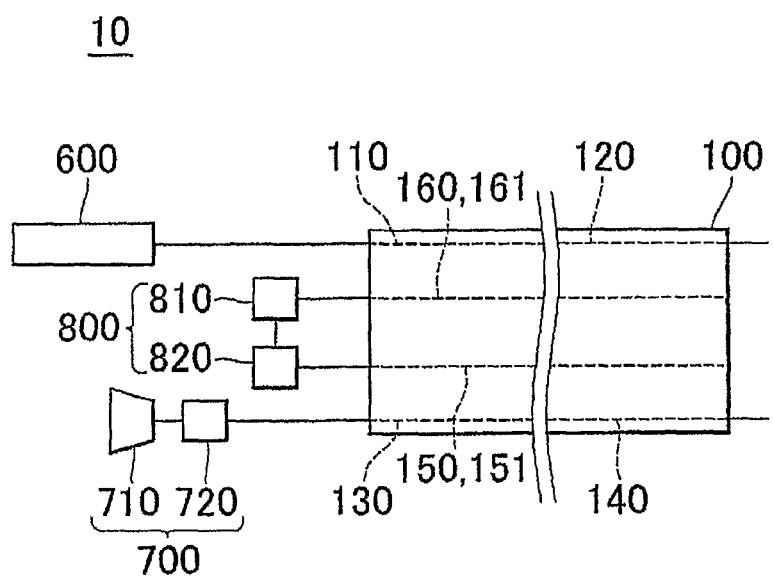
- FIG. 1 is an explanatory drawing illustrating schematically a configuration of the fuel cell system of the first embodiment.

FIG. 1 is an explanatory drawing illustrating schematically the configuration of a fuel cell system of the first embodiment. A fuel cell system 10 includes a fuel cell 100, a fuel gas tank 600, an oxidizing gas supply unit 700, and a coolant supply unit 800. The fuel gas tank 600 is connected to a fuel gas supply manifold 110 of the fuel cell 100. The oxidizing gas supply unit 700 has an air intake unit 710 and a compression pump 720, and the air intake unit, 710 and compression pump 720 are connected to the oxidizing gas supply manifold 130 of the fuel cell 100. The coolant supply unit 800 has a radiator 810 and a pump 820, and the radiator 810 and pump 820 are connected to coolant supply manifolds 150 and 151 and coolant discharge manifolds 160 and 161 of the fuel cell.

Figure 2:
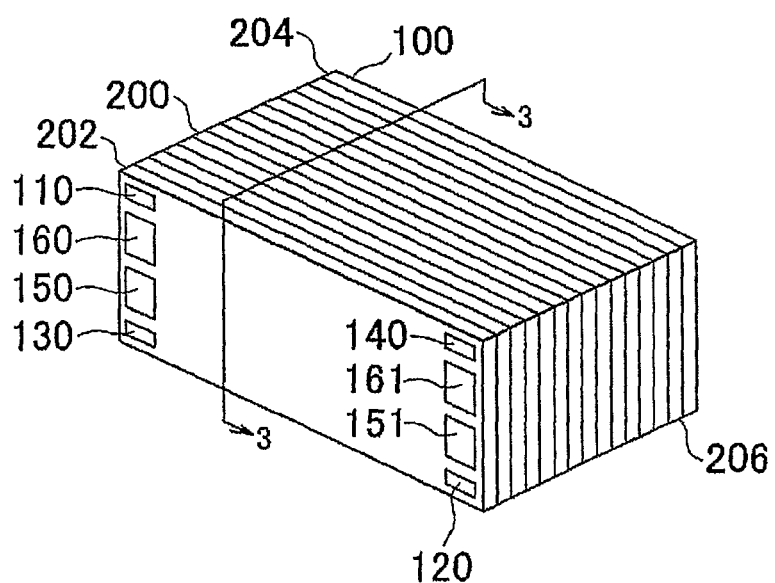
FIG. 2 is a perspective view illustrating the external appearance of the fuel cell.

FIG. 2 is a perspective view illustrating the external appearance of the fuel cell 100. The fuel cell 100 includes a cell unit 200 and end plates 202 and 204. In the embodiment, a plurality of cell units 200 are stacked, but only one cell unit 200 may be also used. The end plates 202 and 204 are disposed at both ends in the stacking direction of cell units 200. The fuel cell 100 is provided with the fuel gas supply manifold 110, a fuel gas discharge manifold 120, the oxidizing gas supply manifold 130, an oxidizing gas discharge manifold 140, coolant supply manifolds 150 and 151, and coolant discharge manifolds 160 and 161, and these manifolds pass through the fuel cell 100 in the stacking direction.

Figure 3:
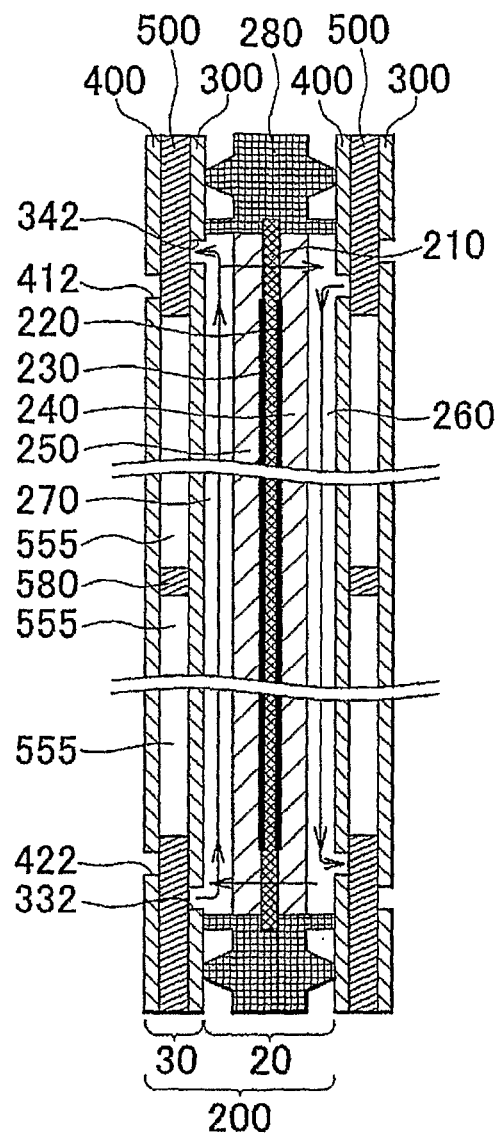
FIG. 3 shows part of a cross section obtained by cutting the fuel cell along a 3-3 cutting line shown in FIG. 2.

FIG. 3 shows part of a cross section obtained by cutting the fuel cell 100 along a 3-3 cutting line shown in FIG. 2. A power generation unit 200 includes a membrane electrode assembly 20 and a separator 30. The membrane electrode assembly 20 includes an electrolyte membrane 210, an anode catalyst layer 220, a cathode catalyst layer 230, an anode-side gas diffusion layer 240, a cathode-side gas diffusion layer 250, and a seal gasket 280.

In the embodiment, for example, a proton-conductive ion-exchange membrane including a fluororesin such as perfluorocarbonsulfonic acid polymer and a hydrocarbon resin is used as the electrolyte membrane 210. The anode catalyst layer 220 and cathode catalyst layer 230 are disposed on respective surfaces of the electrolyte membrane 210. In the embodiment, for example, a catalyst layer in which a platinum catalyst or a platinum alloy catalyst composed of platinum and another metal is supported, for example, on carbon particles is used as the anode catalyst layer 220 and cathode catalyst layer 230.

The anode-side gas diffusion layer 240 and cathode-side gas diffusion layer 250 are disposed on the outer surface of the anode catalyst layer 220 and cathode catalyst layer 230, respectively. In the embodiment, a carbon cloth using a carbon nonwoven fabric or carbon paper is used as the anode-side gas diffusion layer 240 and cathode-side gas diffusion layer 250.

The seal gasket 280 is formed so as to surround the outer edge of the electrolyte membrane 210, anode-side gas diffusion layer 240, and cathode-side gas diffusion layer 250. The seal gasket 280 is formed integrally with the electrolyte membrane 210, anode-side gas diffusion layer 240, and cathode-side gas diffusion layer 250, for example, by injection molding.

The separator 30 includes a cathode plate 300, an anode plate 400, and an intermediate film 500. The cathode plate 300 is disposed on the outside of the cathode-side gas diffusion layer 250. The intermediate film 500 is disposed on the outside of the cathode plate 300, and the anode plate 400 is disposed further on the outside of the intermediate film 500. In the embodiment, a configuration is used in which the membrane electrode assembly 20 and separator 30 are disposed alternately. Therefore, the anode plate 400 is disposed on the outside of the anode-side gas diffusion layer 240 of the membrane electrode assembly 20. A fuel gas channel 260 is formed between the anode plate 400 and anode-side gas diffusion layer 240, and an oxidizing gas channel 270 is formed between the cathode plate 300 and cathode-side gas diffusion layer 250. In the embodiment, a space between the anode plate 400 and anode-side gas diffusion layer 240 is used as the fuel gas channel 260, but it is also possible, for example, to dispose a porous body made from a metal or the like and use the porous body as the fuel gas channel 260. The same is true for the oxidizing gas channel 270.

Figure 4:
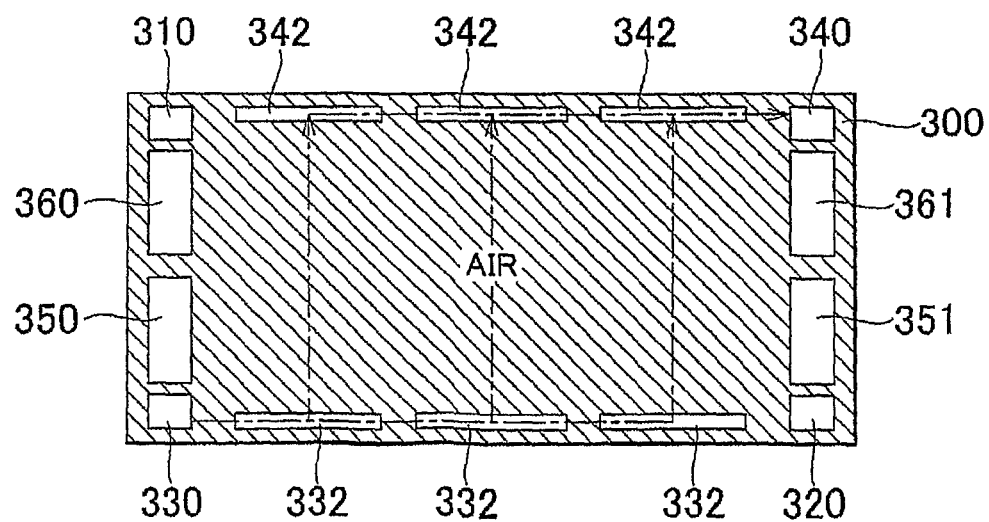
FIG. 4 is a plan view of the cathode plate of the fuel cell.

FIG. 4 is a plan view of the cathode plate 300. The cathode plate 300 is, for example, a plate-shaped member of an almost quadrangular shape that is made from a metal. Openings 310 to 361 are formed in the outer edge portion on the short sides of the cathode plate 300. These openings 310, 330, 350, 360, 320, 340, 351, and 361 serve to form the fuel gas supply manifold 110, fuel gas discharge manifold 120, oxidizing gas supply manifold 130, oxidizing gas discharge manifold 140, coolant supply manifolds 150 and 151, and coolant discharge manifolds 160 and 161 shown in FIG. 2. The openings 350 and 351 are disposed on the lower side, as shown in the figure, and the openings 360 and 361 are disposed on the upper side, as shown in the figures. Furthermore, the opening 350 and opening 360 are disposed adjacently on the same side, and the opening 351 and opening 361 are disposed adjacently on the same side. Elongated thin openings 332 are formed in the outer edge portion on the lower long side of the cathodes plate 300, and elongated thin openings 342 are formed in the outer edge portion on the upper long side. The openings 332 are used to supply the oxidizing gas to the oxidizing gas channel 270, and the openings 342 are used to discharge the oxidizing gas from the oxidizing gas channel 270. Therefore, in this embodiment, as shown in FIG. 3, the oxidizing gas flows in the down-up direction, as shown in the figure, in the oxidizing gas channel 270. In the embodiment, air is used as the oxidizing gas. The openings 310 to 361, 332, and 342 are formed, for example, by punching.

Figure 5:
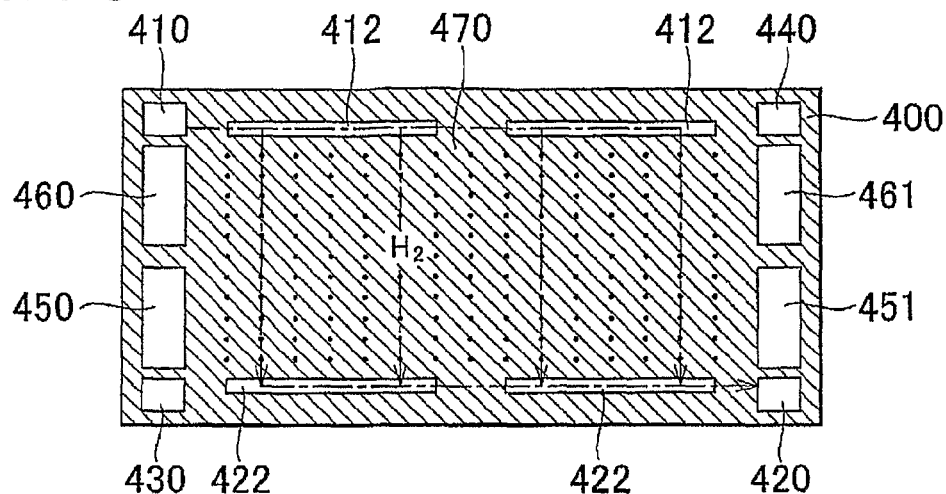
FIG. 5 is a plan view of the anode plate of the fuel cell.

FIG. 5 is a plan view of the anode plate 400. The anode plate 400 is, for example, a plate-shaped member of an almost quadrangular shape that is made from a metal. Openings 410, 430, 450, 460, 420, 440, 451, and 461 are formed in the outer edge portion on the short sides of the anode plate 400. The position and size of the openings 410 to 461 correspond to the position and size of respective openings 310 to 361 of the cathode plate. Long thin openings 412 are formed in the outer edge portion on the upper long side of the anode plate 400, and openings 422 are formed in the outer edge portion on the lower long side. The openings 412 are used to supply the fuel gas to the fuel gas channel 260, and the openings 422 are used to discharge the fuel gas from the fuel gas channel 260. Therefore, in this embodiment, as shown in FIG. 3, the fuel gas flows in the up-down direction, as shown in the figure, in the fuel gas channel 260. In the embodiment, hydrogen is used as the fuel gas. Because the oxidizing gas flows in the down-up direction, as shown in the figure, in the oxidizing gas channel 270, as described hereinabove, the oxidizing gas and fuel gas flow in the opposite direction (counterflow). The openings 410 to 460, 412, and 422 are formed, for example, by punching. A plurality of convex portions 470 are formed in the central portion of the anode plate 400. Some of convex portions 470 are used for positioning the below-described channel formation portions 570 and 580. The height of convex portion 470 is set to be almost equal to the thickness of the intermediate film 500. Therefore, when the anode plate 400, intermediate film 500, and cathode plate 300 are laminated, the convex portions 470 of the anode plate come into contact with the cathode plate 300. As a result, the cathode plate 300 and anode plate 400 are conductively connected. The convex portions 470 are formed, for example, by pressing.

Figure 6:
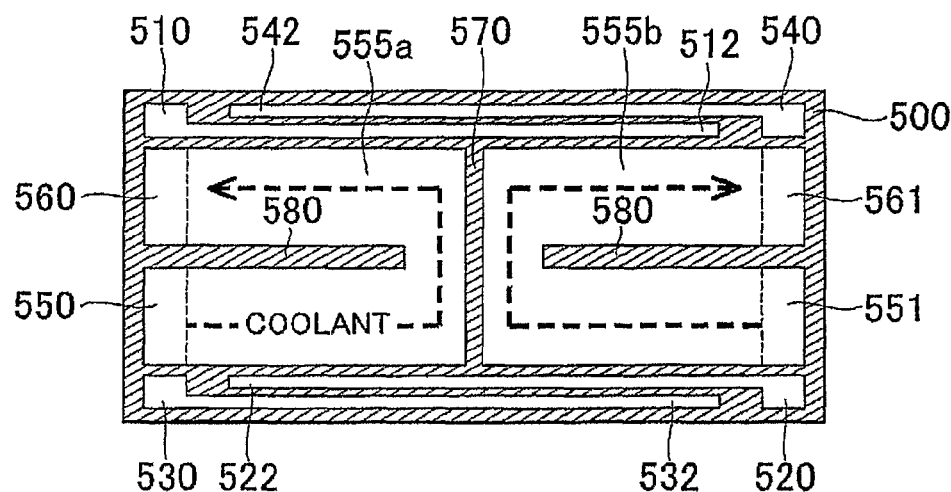
FIG. 6 is a plan view of the intermediate film of the fuel cell.

FIG. 6 is a plan view of the intermediate film 500. The intermediate film 500 is, for example, a plate-shaped member of an almost quadrangular shape that is made of a thermoplastic resin. As shown in FIG. 3, the intermediate film 500 serves to bond the cathode plate 300 and anode plate 400 together. Openings 510, 530, 550, 560, 520, 540, 551, and 561 are formed in the outer edge portions on short sides of the intermediate film 500. The position and size of openings 510 to 561 correspond to the position and size of corresponding openings 310 to 361 of the cathode plate. Link portions 512 and 522 extend from the openings 510 and 520 along the longitudinal direction, and link portions 532 and 542 extend from the openings 530 and 540 along the longitudinal direction. After the separator 30 has been formed, the link portions 512 and 522 are linked to the openings 412 and 422 of the anode plate 400, and the link portions 532 and 542 are linked to the openings 332 and 342 of the cathode plate 300. An opening 555 serving as a space where a coolant flows is formed in the central portion of the intermediate film 500. The opening 555 is divided in two, left and right, openings 555a, and 555b by a first channel formation portion 570. The openings 555a and 555b function as coolant channels in which the coolant flows, and a second channel formation portion 580 for curving the coolant channel into a U-like shape is formed in these openings. Thus, on the left side in the figure, the coolant is supplied from the opening 550, flows along a U-shaped trajectory in the opening 555, and is discharged into the opening 560. On the right side in the figure, the flow pattern is the same. The openings 510 to 561, link portions 512, 522, 532, and 542, and openings 555 and 556 are formed by punching.

Figure 7:
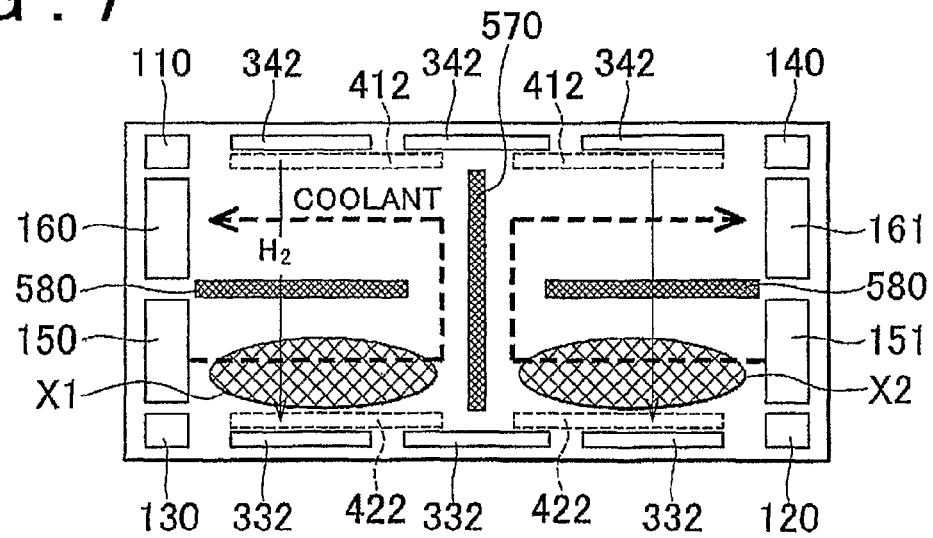
FIG. 7 is an explanatory drawing illustrating schematically the flow of coolant in the cell units that are stacked to form the fuel cell.

FIG. 7 is an explanatory drawing illustrating schematically the flow of coolant in the cell unit 200. The manifolds 110, 130, 150, 160, 120, 140, 151, and 161 pass through the outer edge portions on the short sides of the cell unit 200, and the openings 332, 342, 412, and 422 are formed in the outer edge portions on the long sides. In the embodiment, the coolant supply manifolds 150 and 151 are disposed in the lower portion of the cell unit 200, that is, in the downstream portion of the fuel gas flow. As a result, new coolant is supplied to lower portions X1 and X2 of the cell unit 200 and they can be easily cooled. Thus, moisture contained in the fuel gas is sufficiently cooled along almost the entire downstream portion of the fuel cell flow and caused to condensate. As a consequence, moisture is prevented from being discharged to the outside of the fuel cell 100, and the electrolyte membrane 210 can be sufficiently wetted.

Figure 8:
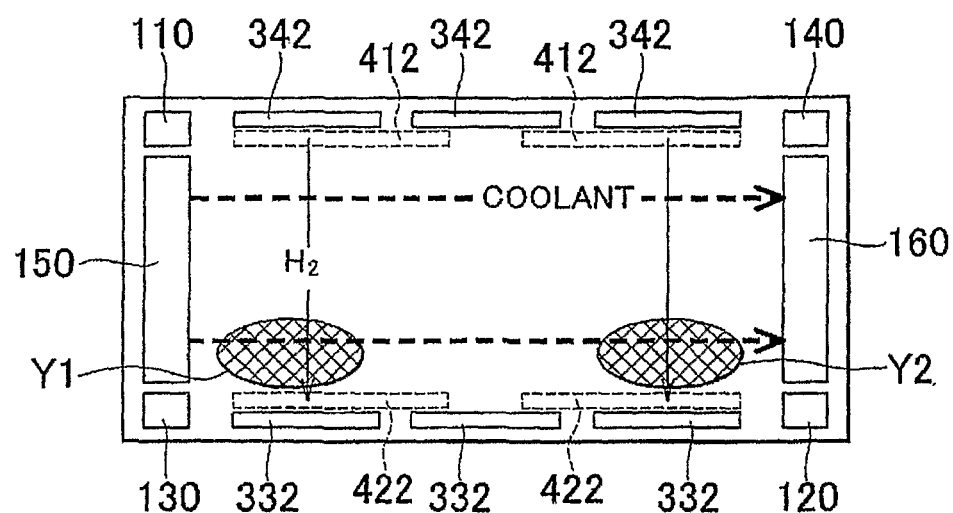
FIG. 8 is an explanatory drawing illustrating schematically the flow of coolant in the comparative example.

FIG. 8 is an explanatory drawing illustrating schematically the flow of coolant in the comparative example. In the comparative example, the flow of coolant from the coolant supply manifold 150 to the coolant discharge manifold 160 is linear and not curved. In this case, new coolant is supplied to a lower portion Y1 of the cell unit 200 on the side of the coolant supply manifold 150. Therefore, this lower portion is easily cooled. In a lower portion Y2 on the side of the coolant discharge manifold 160, the coolant temperature rises as it passes in the cell unit 200. Therefore, cooling is more difficult than in the lower portion Y1. For this reason, it is possible that moisture will hardly condensate in the lower portion Y2 and that a large amount of moisture will be removed together with the fuel exhaust gas.

As described hereinabove, in the embodiment, sufficient cooling is performed and moisture condensates over almost the entire downstream portion of the fuel gas flow. Therefore, the moisture is prevented from being taken out to the outside of the fuel cell 100 and the electrolyte membrane 210 can be wetted. Furthermore, in this case, the moisture contained in the fuel gas can be effectively used for wetting the electrolyte membrane.

Figure 9:
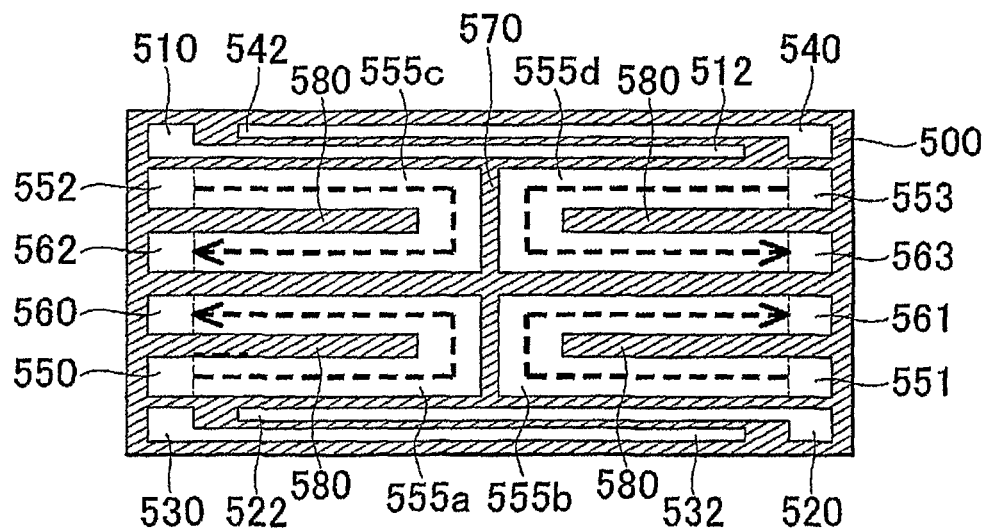
FIG. 9 is a plan view of an intermediate membrane of the second embodiment.

FIG. 9 is a plan view of an intermediate membrane 500 of the second embodiment. In the first embodiment, the opening 555 constituting the coolant channel is divided into two, left and right openings 555a and 555b, but the second embodiment is different from the first embodiment in that the opening 555 is divided into four (upper, lower, left, and right) openings (555a to 555d) by a first channel formation portion 570. The openings 555a to 555d are formed in a U-like shape. The coolant supply portions (openings 550 to 553) leading to the openings 555a to 555d are disposed at the edges of the short sides, and the coolant discharge portions (openings 560 to 563) leading from the openings 555a to 555d are disposed in the central portions of the short sides. Therefore, in the second embodiment, the coolant flows in the upstream and downstream portions of the oxidizing gas and the upstream and downstream portions of the fuel gas prior to flowing in the central portion. With such a configuration, moisture can be caused to condensate in the upstream portion and downstream portion of the oxidizing gas flow and in the upstream portion and downstream portion of the fuel gas flow. As a result, the moisture is prevented from being taken out to the outside of the fuel cell 100, and the electrolyte membrane 210 can be wetted. In addition, because the upstream portion of the oxidizing gas is cooled, evaporation of moisture from the electrolyte membrane 210 can be inhibited.

Figure 10:
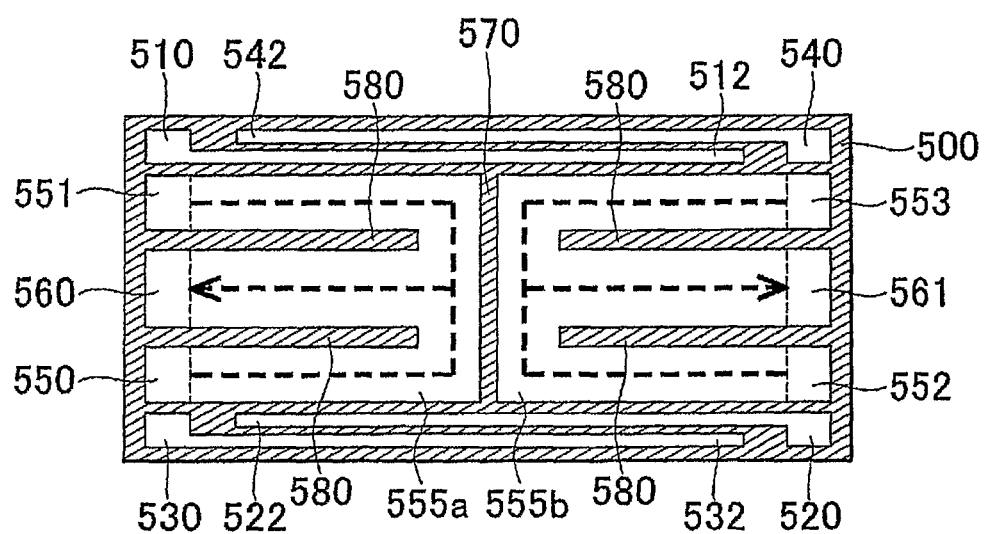
FIG. 10 is a plan view of an intermediate membrane of the third embodiment.

FIG. 10 is a plan view of an intermediate membrane 500 of the third embodiment. The third embodiment differs from the second embodiment in that the downstream portion of the coolant channel is integrated. Thus, openings 555*a* and 555*b* are divided in two (left and right) by a first channel formation portion 570, but have an E-like rather than U-like shape. The coolant supply portions (openings 550 to 553) leading to the openings 555*a* and 555*b* are disposed at the edges of the short sides, and the coolant discharge portions (openings 560 and 561) leading from the openings 555*a* and 555*b* are disposed in the central portions of the short sides. In this case, the moisture can be also caused to condensate in the upstream portion and downstream portion of the oxidizing gas flow and the upstream portion and downstream portion of the fuel gas flow, the moisture can be prevented from being taken out to the outside of the fuel cell 100, and the electrolyte membrane 210 can be wetted. Because the upstream portion of the oxidizing gas is also cooled, evaporation of the moisture from the electrolyte membrane 210 can be prevented.

Figure 11:
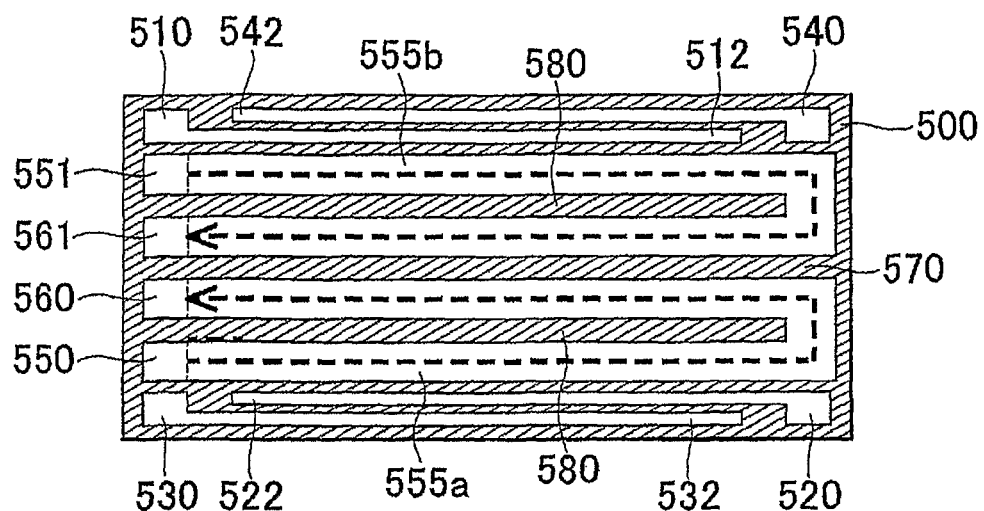
FIG. 11 is a plan view of an intermediate membrane of the fourth embodiment.

FIG. 11 is a plan view of an intermediate film 500 of the fourth embodiment. In the fourth embodiment, an opening 555 constituting the coolant channel is divided into upper and lower openings, and the openings 555*a* and 555*b* are formed in a U-like shape. The coolant supply portions (openings 550 and 551) leading to the openings 555*a* and 555*b* and the coolant discharge portions (openings 560 and 561) leading from the openings 555*a* and 555*b* are disposed at the same short side. As a result, at the side opposite that where the openings 550, 551, 560, and 561 are disposed, an electrolyte membrane 210 can be expanded to the vicinity of this opposite side. Therefore, the surface area of the electrolyte membrane 210 can be enlarged and the amount of electric current that can be supplied can be increased.

Figure 12:
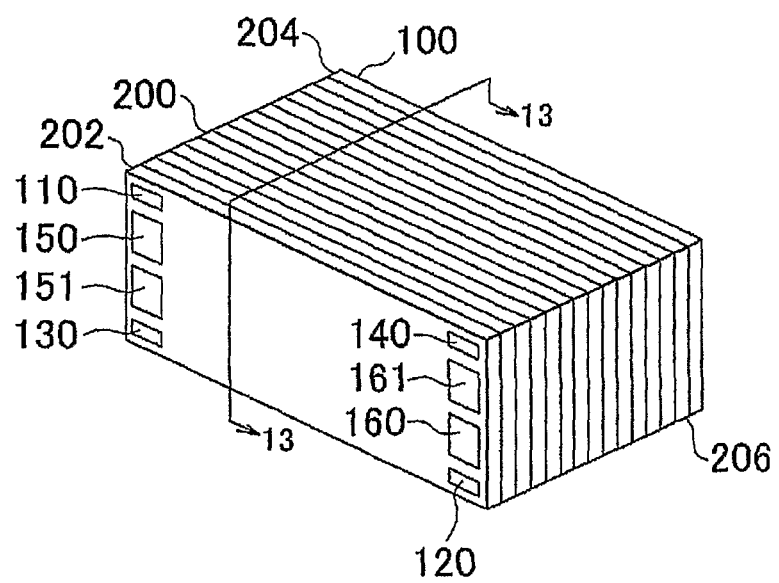
FIG. 12 is an explanatory drawing illustrating schematically the external appearance of the fuel cell of the fifth embodiment.

FIG. 12 is an explanatory drawing illustrating schematically the external appearance of the fuel cell of the fifth embodiment. In the fifth embodiment, coolant supply manifolds 150 and 151 are disposed on the same short side (left side in the figure), and coolant discharge manifolds 160 and 161 are disposed on the same short side (right side in the figure).

Figure 13:
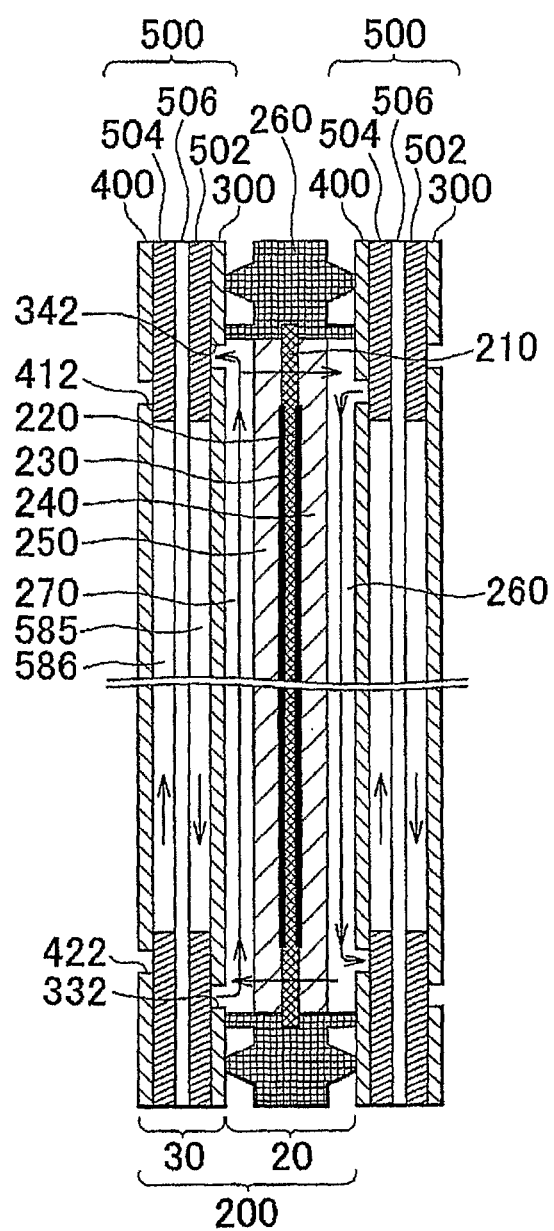
FIG. 13 shows part of a cross section obtained by cutting the fuel cell along a 13-13 cutting line shown in FIG. 12.

FIG. 13 shows part of a cross section obtained by cutting the fuel cell 100 along a 13-13 cutting line shown in FIG. 12. The fifth embodiment differs from the first embodiment in that the intermediate film 500 of the first embodiment has a three-layer structure including a first intermediate film 502, a second intermediate film 504, and an intermediate plate 506. The first intermediate film 502 is adjacent to a cathode plate 300, and the second intermediate film 504 is adjacent to an anode plate 400. The intermediate plate 506 is disposed between the first intermediate film 502 and second intermediate film 504.

Figure 14:
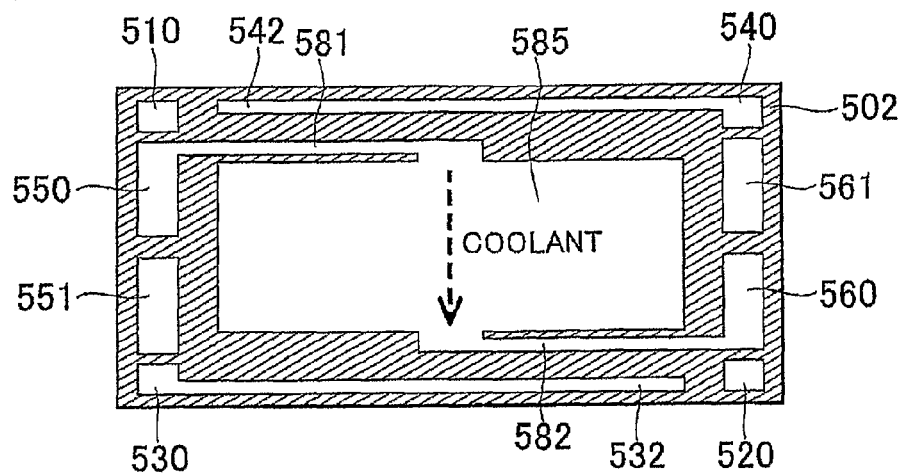
FIG. 14 is a plan view of the first intermediate film of the fuel cell.

FIG. 14 is a plan view of the first intermediate film 502. The first intermediate film 502 is, for example, a plate-shaped member of an almost quadrangular shape that is made of a thermoplastic resin. Openings 510, 530, 550, 551, 520, 540, 560, and 561 for forming manifolds and link portions 532 and 542 are formed in the outer edge portions of the first intermediate film 502, and an opening 585 is formed in the central portion. The opening 585 functions as a coolant channel. The upper and lower portions of the opening 585 are linked to the openings 550 and 560 by link portions 581 and 582, respectively. As a result, the coolant flows parallel to the flow direction of reactive gases. In the embodiment, as shown in FIG. 13, in the opening 585 of the first intermediate film 502, the coolant flows from top to bottom, as shown in the figure, in the direction opposite that of the adjacent flow of oxidizing gas. As a result, the downstream portion of the oxidizing gas flow can be cooled preferentially, moisture can be caused to condensate, and the electrolyte membrane 210 can be wetted.

Figure 15:
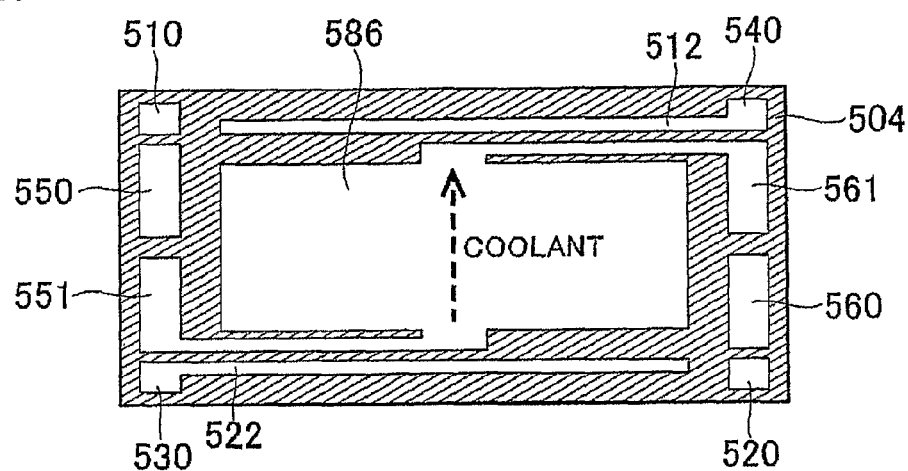
FIG. 15 is a plan view of the second intermediate film of the fuel cell.

FIG. 15 is a plan view of the second intermediate film 504. The second intermediate film 504 is, for example, a plate-shaped member of an almost quadrangular shape that is made of a thermoplastic resin. Openings 510, 530, 550, 551, 520, 540, 560, 561, and 586 and link portions 512 and 522 are formed in the second intermediate film 504 in the same manner as in the first intermediate film 502. In the embodiment, as shown in FIG. 13, in the opening 586 of the first intermediate film 502, the coolant flows from bottom upward, as shown in the figure, in the direction opposite that of the adjacent flow of fuel gas. As a result, the downstream portion of the fuel gas flow can be cooled preferentially, moisture can be caused to condensate, and the electrolyte membrane 210 can be wetted.

Figure 16:
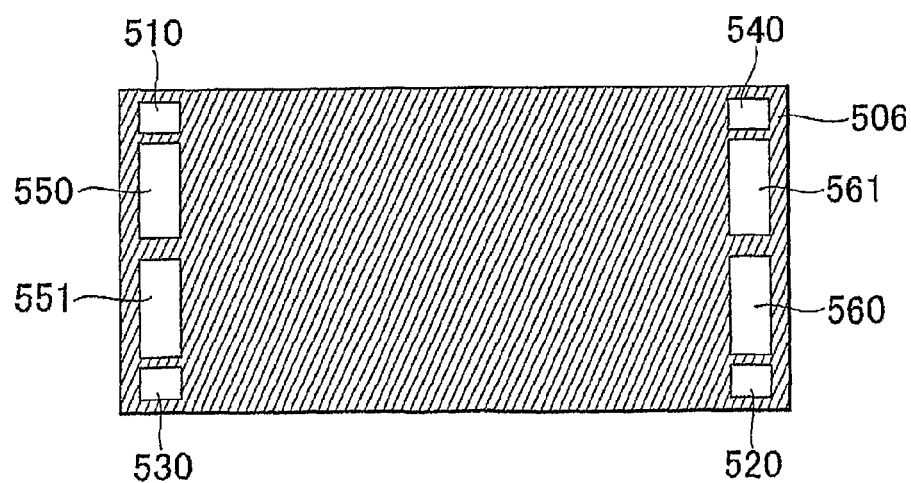
FIG. 16 is a plan view of the intermediate plate of the fuel cell.

FIG. 16 is a plan view of the intermediate plate 506. The intermediate plate 506 is, for example, a plate-shaped member of an almost quadrangular shape that is made of a metal. Openings 510, 530, 550, 551, 520, 540, 560, and 561 for forming manifolds are formed in the intermediate plate 506. The intermediate plate 506 has a function of separating the coolant flowing through the opening 585 of the first intermediate film 502 and the coolant flowing through the opening 586 of the second intermediate film 504.

Figure 17:
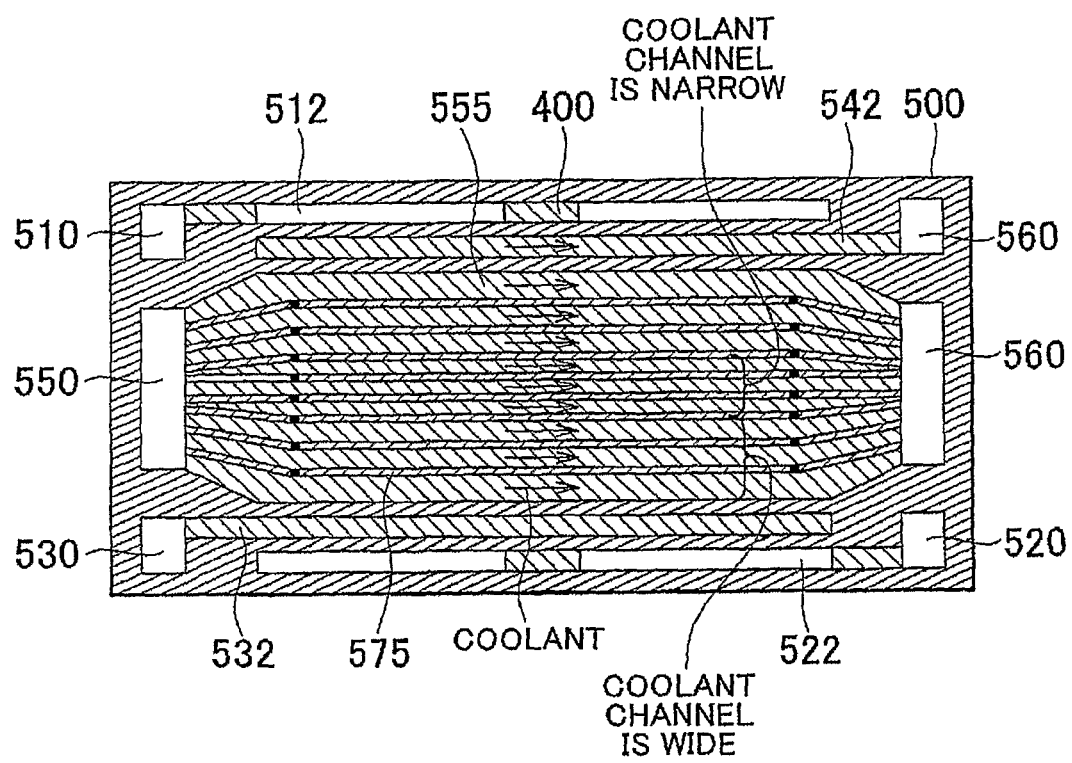
FIG. 17 is a plan view of the fuel cell of the sixth embodiment.

With the above-described fifth embodiment, the downstream portion of the oxidizing gas flow is preferentially cooled by the coolant flowing through the opening 585, and the downstream portion of the fuel gas flow is preferentially cooled by the coolant flowing through the opening 586. Therefore, moisture can be caused to condensate, the moisture can be prevented from being taken out to the outside of the fuel cell 100, and the electrolyte membrane can be wetted FIG. 17 is a plan view of a fuel cell of the sixth embodiment. FIG. 17 illustrates a state in which an intermediate film 500 is disposed on an anode plate 400, and parts of the anode plate 400 are seen via the openings of the intermediate film 500. In the sixth embodiment, channel formation portions 575 are disposed densely in the central portion, as shown in the figure, of the opening 555 and sparsely in the outer edge portions, as shown in the figure. As a result, the amount of coolant flowing in the outer edge portions (upper and lower portions in the figure) of the opening 555 is increased. By contrast, the amount of coolant flowing in the central portion of the opening 555 is decreased. As a result, the upstream portion and downstream portion of the reactive gas flow can be preferentially cooled, moisture can be caused to condensate, and an electrolyte membrane 210 can be wetted.

Figure 18:
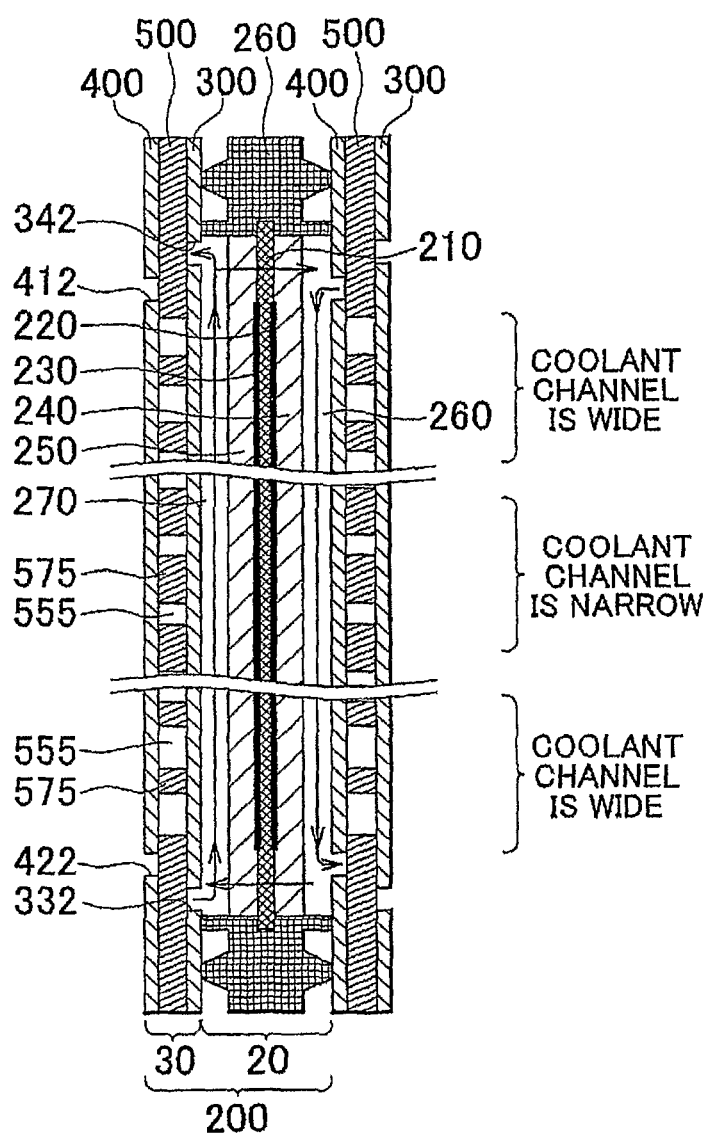
FIG. 18 is an explanatory drawing illustrating schematically the cross section of a fuel cell system of the seventh embodiment.

FIG. 18 is an explanatory drawing illustrating schematically the cross section of a fuel cell system of the seventh embodiment. In the seventh embodiment, the size of a channel formation portion 575 is made larger in the central portion, as shown in the figure, of an opening 555 and smaller in the outer edge portions, as shown in the figure. As a result, the amount of coolant flowing in the outer edge portions, as shown in the figure, of the opening 555 is increased. The amount of coolant flowing in the central portion, as shown in the figure, is decreased. As a result, the upstream portion and downstream portion of the reactive gas flow can be preferentially cooled, moisture can be caused to condensate, and an electrolyte membrane 210 can be wetted.

As follows from the sixth and seventh embodiment, the channel formation portions 575 are disposed in the opening 555 of the intermediate film 500, and at least either of the size and disposition density of the channel formation portions 575 differs between the outer edge portions and central portion of the opening.

Figure 19:
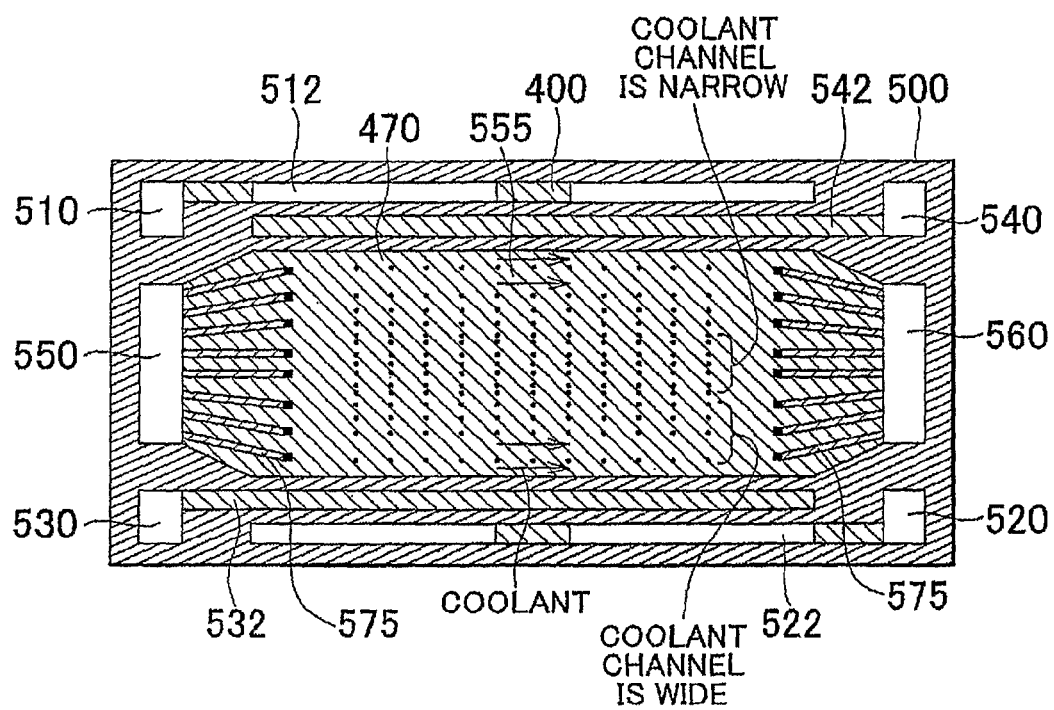
FIG. 19 is a plan view of the fuel cell of the eighth embodiment.

FIG. 19 is a plan view of a fuel cell of the eighth embodiment. Similarly to FIG. 17, FIG. 19 shows a state in which the intermediate film 500 is disposed on the anode plate 400. In the eighth embodiment, the sparse or dense distribution of convex portions 470 of the anode plate 400 is used instead of the size and disposition density. Thus, in the eighth embodiment, convex portions 470 are disposed densely in the central portion, as shown in the figure, of the opening 555 and sparsely in the outer edge portions, as shown in the figure. As a result, similarly to the sixth embodiment, the upstream portion and downstream portion of the reactive gas flow can be preferentially cooled, moisture can be caused to condensate, and an electrolyte membrane 210 can be wetted.

Modification Examples: in the above-described embodiment, a three-layer separator is explained by way of example, but such a separator configuration is not limiting. For example, a two-layer separator and a single-layer separator configuration may be also used.

In the above-described embodiment, the convex portions 470 are formed at the anode plate 400, but convex portions may be also formed at the cathode plate 300.

In the above-described embodiments, the intermediate film 500 is produced form a thermoplastic resin, but it may be also formed from resins of other types or from a metal.

As for positions and shapes of openings provided in the cathode plate 300, anode plate 400, and intermediate film 500, a variety of configurations other than those of the above-described embodiments can be used.

While several embodiments of the invention have been described herein, these embodiments merely serve to facilitate the understanding of the invention and place no limitation on the invention. The invention can be changed and modified without departing from spirit of the invention or the scope of the claims. The invention obviously includes equivalents thereof.

The invention claimed is:

1. A fuel cell comprising:
an electrolyte membrane;
an anode catalyst layer and a cathode catalyst layer that are provided on respective surfaces of the electrolyte membrane:
a fuel gas channel disposed on a side of the anode catalyst layer;
an oxidizing gas channel disposed on a side of the cathode catalyst layer;
a coolant channel in which a coolant flows; and
a rectangular separator, wherein
the separator includes openings that are formed at outer edge portions on first sides opposite each other, and used to supply a fuel gas to the fuel gas channel and to discharge the fuel gas from the fuel gas channel, respectively,
the separator includes openings that are formed at the outer edge portions on the first sides, and used to supply an oxidizing gas to the oxidizing gas channel and to discharge the oxidizing gas from the oxidizing gas channel, respectively,
the separator includes a first inlet port that is formed at one end portion of a second side, a second inlet port that is formed at the other end portion of the second side and used to supply the coolant to the coolant channel, and outlet ports that are formed at central portions of the second side, and used to discharge the coolant from the coolant channel, the outlet ports being between the one end portion of the second side and the other end portion of the second side,
a flow direction of the fuel gas flowing in the fuel gas channel is opposite to a flow direction of the oxidizing gas flowing in the oxidizing gas channel,
the coolant channel is configured to cause a coolant flow between each of the first inlet port and the second inlet port and the outlet ports to curve in a U-shape, whereby a downstream portion of the flow of the fuel gas and upstream portion of the flow of the oxidizing gas, in planes of the anode catalyst layer and the cathode catalyst layer, are cooled more than a central portion of the flow of the fuel gas and a central portion of the flow of the oxidizing gas within the planes, respectively; and
the coolant channel is configured to cool both of the downstream portion of the flow of the fuel gas and a downstream portion of the flow of the oxidizing gas.

2. The fuel cell according to claim 1, wherein
a channel formation portion that causes a coolant flow to curve between the inlet ports and outlet ports is formed in the coolant channel.

3. The fuel cell according to claim 2, wherein
the channel formation portion has a sand spit shape protruding from the side of the separator toward the central portions.

4. The fuel cell according to claim 1, wherein
a plurality of channel formation portions that guide the coolant from the inlet ports to the outlet ports are formed in the coolant channel, and a spacing between the adjacent channel formation portions is small in the central portions of the separator and large in outer edge portions.

5. The fuel cell according to claim 1, wherein
the inlet ports and the outlet ports are provided respectively on opposing sides of the separator.

6. The fuel cell according to claim 1, wherein
the coolant channel includes a first coolant channel adjacent to the fuel gas channel and a second coolant channel that is provided separately from the first coolant channel and adjacently to the oxidizing gas channel, the flow direction of the fuel gas is opposite to a flow direction of the coolant flowing in the first coolant channel, and the flow direction of the oxidizing gas is opposite to a flow direction of the coolant flowing in the second coolant channel.

7. A fuel cell system, comprising:
the fuel cell according to claim 1;
a reactive gas supply portion that supplies the fuel gas and the oxidizing gas; and
a coolant supply portion that supplies the coolant, wherein
the electrolyte membrane is wetted by causing moisture contained in the fuel gas and the oxidizing gas to condensate by cooling a downstream portion of at least one of the fuel gas and the oxidizing gas flows with the coolant channel, without providing a humidifying module for humidifying the fuel gas and the oxidizing gas.

8. The fuel cell according to claim 1, wherein
the outlet ports include a first outlet port and a second outlet port, and
the coolant channel is configured to cause a coolant flow between the first inlet port and the first outlet port and a coolant flow between the second inlet port and the second outlet port to each curve in the U-shape, whereby the downstream portion of the flow of the fuel gas and the upstream portion of the flow of the oxidizing gas, in planes of the anode catalyst layer and the cathode catalyst layer, are cooled more than a central portion of the flow of the fuel gas and a central portion of the flow of the oxidizing gas within the planes, respectively.

9. The fuel cell according to claim 1, wherein the first inlet port and the second inlet port are each provided at one of the upstream portion and the downstream portion of each of the flows of the oxidizing gas and the fuel gas.

\* \* \* \* \*